US012674965B2

(12) United States Patent
Lin et al.

(10) Patent No.: US 12,674,965 B2
(45) Date of Patent: Jul. 7, 2026

(54) OPTICAL IMAGING LENS

(71) Applicant: Calin Technology Co., Ltd., Taichung City (TW)

(72) Inventors: Fun-Ru Lin, Taichung City (TW); Shu-Chuan Hsu, Taichung City (TW)

(73) Assignee: CALIN TECHNOLOGY CO., LTD., Taichung City (TW)

( * ) Notice: Subject to any disclaimer, the term of this patent is extended or adjusted under 35 U.S.C. 154(b) by 243 days.

(21) Appl. No.: 18/743,926

(22) Filed: Jun. 14, 2024

(65) Prior Publication Data

US 2025/0208380 A1     Jun. 26, 2025

(30) Foreign Application Priority Data

Dec. 25, 2023     (TW) .................................. 112150649

(51) Int. Cl.
　　*G02B 13/00*　　　(2006.01)
　　*G02B 9/64*　　　(2006.01)
(52) U.S. Cl.
　　CPC ........... *G02B 13/0045* (2013.01); *G02B 9/64* (2013.01)
(58) Field of Classification Search
　　CPC .............................. G02B 13/0045; G02B 9/64
　　USPC ........................................................ 359/708
　　See application file for complete search history.

(56) References Cited

U.S. PATENT DOCUMENTS

| 10,845,571 B2 * | 11/2020 | Lin ........................... G02B 9/64 |
| 2019/0369363 A1 * | 12/2019 | Chen ....................... G02B 15/16 |

| 2021/0003822 A1 * | 1/2021 | Chang ...................... G02B 9/10 |
| 2021/0373286 A1 * | 12/2021 | Lin ....................... G02B 13/004 |
| 2023/0133605 A1 * | 5/2023 | Lin .......................... G02B 9/64 |
| | | 359/682 |

FOREIGN PATENT DOCUMENTS

| CN | 114002825 A | 2/2022 |
| JP | 8-254653 A | 10/1996 |
| JP | 2006-39094 A | 2/2006 |
| JP | 2007-212847 A | 8/2007 |
| JP | 2014-102291 A | 6/2014 |

(Continued)

OTHER PUBLICATIONS

European Search Report of application 112150649 received dated Apr. 10, 2024.

*Primary Examiner* — Sharrief I Broome
(74) *Attorney, Agent, or Firm* — Birch, Stewart, Kolasch & Birch, LLP

(57)     ABSTRACT

An optical imaging lens, in order from an object side to an image side along an optical axis, includes a first lens assembly, an aperture, and a second lens assembly. The first lens assembly consists of, a first lens having negative refractive power, a second lens having negative refractive power, and a third lens having positive refractive power. The second lens assembly consists of, a fourth lens having positive refractive power, a fifth lens having positive refractive power, a sixth lens having negative refractive power, and a seventh lens having positive refractive power. An air space is provided between any two adjacent lenses of the seven lenses instead of being adhered to one another. The optical imaging lens satisfies: 0.2<F/fg2<0.5, wherein F is a focal length of the optical imaging lens; fg2 is a focal length of the second lens assembly, thereby achieving the effect of high image quality.

20 Claims, 9 Drawing Sheets

(56)     References Cited

FOREIGN PATENT DOCUMENTS

| | | | |
|---|---|---|---|
| JP | 2018-523150 | A | 8/2018 |
| TW | 202107142 | A | 2/2021 |
| TW | 202331332 | A | 8/2023 |

* cited by examiner

OPTICAL IMAGING LENS

BACKGROUND OF THE INVENTION

Technical Field

The present invention generally relates to an optical image capturing system, and more particularly to an optical imaging lens, which provides a better optical performance of low distortion and high image quality.

Description of Related Art

In recent years, with advancements in portable electronic devices having camera functionalities, the demand for an optical image capturing system is raised gradually. The ordinary optical image capturing system is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role in the field of vehicle safety, collecting real-time environmental information through various lenses and sensors to provide the comprehensive insights of the driver. Furthermore, as the automotive lens changes with the temperature of an external application environment, the temperature requirements of the image quality of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality.

The present invention provides an optical imaging lens, in order from an object side to an image side along an optical axis, including a first lens assembly, an aperture, and a second lens assembly, wherein the first lens assembly consists of, in order from the object side to the image side along the optical axis, a first lens, a second lens, and a third lens. The first lens has negative refractive power. An object-side surface of the first lens is a convex surface, and an image-side surface of the first lens is a concave surface. The second lens has negative refractive power, and an image-side surface of the second lens is a concave surface. The third lens has positive refractive power, and an image-side surface of the third lens is a convex surface. The second lens assembly consists of, in order from the object side to the image side along the optical axis, a fourth lens, a fifth lens, a sixth lens, and a seventh lens. The fourth lens is a biconvex lens with positive refractive power. The fifth lens has positive refractive power, and an image-side surface of the fifth lens is a convex surface. The sixth lens is a biconcave lens with negative refractive power. The seventh lens is a biconvex lens with positive refractive power. An air space is provided between any two adjacent lenses from the first lens to the seventh lens along the optical axis. The optical imaging lens satisfies: 0.2<F/fg2<0.5, wherein F is a focal length of the optical imaging lens; fg2 is a focal length of the second lens assembly.

The effect of the present invention lies in arranging at least seven lenses into an optical assembly for an optical imaging lens. In addition, the arrangement of the refractive powers and the conditions of the optical imaging lens of the present invention could achieve the effect of high image quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
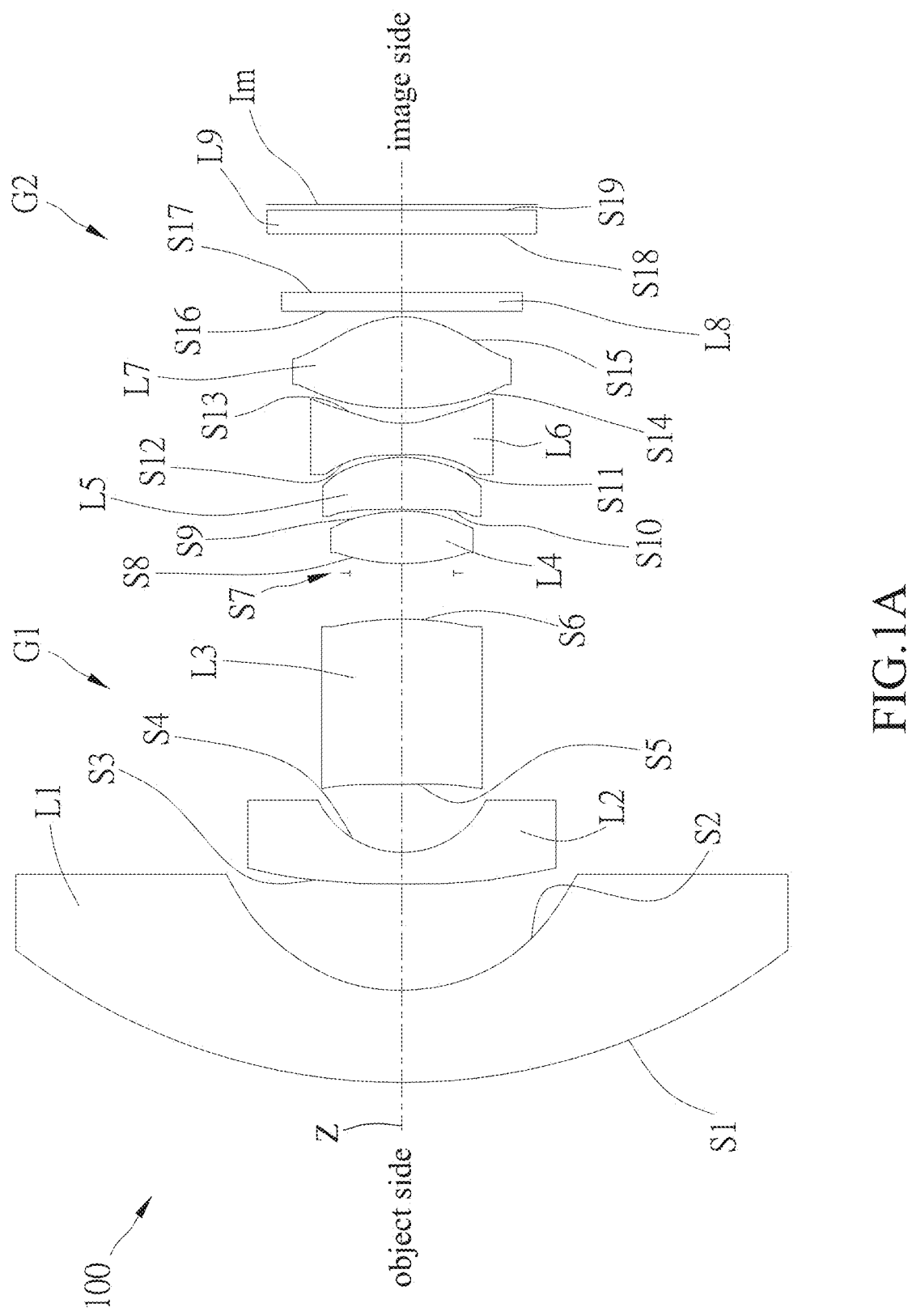
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first lens assembly G1, an aperture S7, and a second lens assembly G2. In the current embodiment, the optical imaging lens 100 includes at least seven lenses, wherein the first lens assembly G1 consists of, in order along the optical axis Z from the object side to the image side, a first lens L1, a second lens L2, and a third lens L3. The second lens assembly G2 consists of, in order along the optical axis Z from the object side to the image side, a fourth lens L4, a fifth lens L5, a sixth lens L6, and a seventh lens L7. In the current embodiment, an air space is provided between any two adjacent lenses from the first lens L1 to the seventh lens L7 along the optical axis, which means that each of the lenses from the first lens L1 to the seventh lens L7 is a single lens, and no two adjacent lenses from the first lens L1 to the seventh lens L7 are adhered to form a compound lens.

The first lens L1 has negative refractive power; an object-side surface S1 of the first lens L1 is a convex surface, and an image-side surface S2 of the first lens L1 is a concave surface; both of the object-side surface S1 and the image-side surface S2 of the first lens L1 are spherical surfaces.

The second lens L2 has negative refractive power; an object-side surface S3 of the second lens L2 is a convex surface, and an image-side surface S4 of the second lens L2 is a concave surface; both of the object-side surface S3 and the image-side surface S4 of the second lens L2 are aspheric surfaces.

The third lens L3 has positive refractive power; an object-side surface S5 of the third lens L3 is a concave surface, and an image-side surface S6 of the third lens L3 is a convex surface; both of the object-side surface S5 and the image-side surface S6 of the third lens L3 are aspheric surfaces.

The fourth lens L4 is a biconvex lens with positive refractive power; both of an object-side surface S8 and an image-side surface S9 of the fourth lens L4 are spherical surfaces.

The fifth lens L5 has positive refractive power; an object-side surface S10 of the fifth lens L5 is a concave surface, and an image-side surface S11 of the fifth lens L5 is a convex surface; both of the object-side surface S10 and the image-side surface S11 of the fifth lens L5 are aspheric surfaces.

The sixth lens L6 is a biconcave lens with negative refractive power; both of an object-side surface S12 and an image-side surface S13 of the sixth lens L6 are aspheric surfaces.

The seventh lens L7 is a biconvex lens with positive refractive power; both of an object-side surface S14 and an image-side surface S15 of the seventh lens L7 are aspheric surfaces.

Additionally, the optical imaging lens 100 further includes an infrared filter L8 and a protective glass L9, wherein the infrared filter L8 forms an object-side surface S16 and an image-side surface S17. The infrared filter L8 is disposed on one side of the image-side surface S15 of the seventh lens L7, thereby restricting infrared rays passing through the optical imaging lens 100 to improve the quality and fidelity of the image. The protective glass L9 forms an object-side surface S18 and an image-side surface S19. The protective glass L9 is disposed between the infrared filter L8 and an image plane Im to protect the infrared filter L8.

In order to keep the optical imaging lens 100 in good optical performance and high imaging quality, in the current embodiment, the optical imaging lens 100 further satisfies:

$$0.1 < F/f3 < 0.3; \quad (1)$$

$$0.2 < F/f5 < 0.5; \quad (2)$$

$$-0.7 < F/fg1 < -0.01; \quad (3)$$

$$0.2 < F/fg2 < 0.5; \quad (4)$$

$$0.1 < F/(f4 + f5 + f6 + f7) < 0.2; \quad (5)$$

wherein F is a focal length of the optical imaging lens 100; f3 is a focal length of the third lens L3; f4 is a focal length of the fourth lens L4; f5 is a focal length of the fifth lens L5; f6 is a focal length of the sixth lens L6; f7 is a focal length of the seventh lens L7; fg1 is a focal length of the first lens assembly G1; fg2 is a focal length of the second lens assembly G2.

Parameters of the optical imaging lens 100 of the first embodiment of the present invention are listed in following Table 1, including the focal length F of the optical imaging lens 100 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 1

| F = 1.40 mm; Fno-2.00; FOV = 195.00 deg | | | | | | | |
|---|---|---|---|---|---|---|---|
| Surface | R(mm) | D(mm) | Nd | Vd | Focal length | Focal Length | Note |
| S1 | 14.40 | 1.87 | 1.50 | 68.71 | −11.11 | −5.02 | First lens L1 |
| S2 | 3.86 | 2.22 | | | | | |
| S3 | 101.03 | 0.70 | 1.62 | 60.53 | −3.11 | | Second lens L2 |
| S4 | 1.89 | 1.41 | | | | | |
| S5 | −60.43 | 3.78 | 1.76 | 27.58 | 10.88 | | Third lens L3 |
| S6 | −7.47 | 0.91 | | | | | |
| S7 | INFINITY | 0.08 | | | | | Aperture S7 |
| S8 | 4.23 | 1.13 | 1.54 | 65.71 | 3.60 | 4.02 | Fourth lens L4 |
| S9 | −3.24 | 0.05 | | | | | |
| S10 | −30.36 | 1.13 | 1.57 | 63.46 | 4.71 | | Fifth lens L5 |
| S11 | −2.49 | 0.05 | | | | | |
| S12 | −13.96 | 0.65 | 1.76 | 27.58 | −2.14 | | Sixth lens L6 |
| S13 | 1.88 | 0.34 | | | | | |
| S14 | 8.43 | 1.93 | 1.49 | 70.41 | 3.60 | | Sevnth lens L7 |
| S15 | −2.06 | 0.12 | | | | | |
| S16 | INFINITY | 0.40 | 1.52 | 64.17 | | | Infrared Filter L8 |
| S17 | INFINITY | 1.23 | | | | | |
| S18 | INFINITY | 0.50 | 1.52 | 64.17 | | | Protective Glass L9 |
| S19 | INFINITY | 0.13 | | | | | |
| Im | INFINITY | | | | | | Image Plane Im |

It could be seen from Table 1 that, in the current embodiment, the focal length F of the optical imaging lens 100 is 1.40 mm, and the Fno is 2, and the FOV is 195.00 degrees, wherein a focal length f1 of the first lens L1 is −11.11 mm; a focal length f2 of the second lens L2 is −3.11 mm; the focal length f3 of the third lens L3 is 10.88 mm; the focal length f4 of the fourth lens L4 is 3.60 mm; the focal length f5 of the fifth lens L5 is 4.71 mm; the focal length f6 of the sixth lens L6 is −2.14 mm; the focal length f7 of the seventh lens L7 is 3.60 mm; the focal length fg1 of the first lens assembly G1 is −5.02 mm; the focal length fg2 of the second lens assembly G2 is 4.02 mm.

Additionally, based on the above detailed parameters, the aforementioned conditions (1) to (5) include a ratio of the focal length F of the optical imaging lens 100 to the focal length f3 of the third lens L3, a ratio of the focal length F of the optical imaging lens 100 to the focal length f5 of the fifth lens L5, a ratio of the focal length F of the optical imaging lens 100 to the focal length fg1 of the first lens group G1, a ratio of the focal length F of the optical imaging lens 100 to the focal length fg2 of the second lens group G2, and a ratio of the focal length F of the optical imaging lens 100 to the focal length of the fourth lens L4 to the seventh lens L7; detailed values of the aforementioned conditions (1) to (5) in the first embodiment are as follows:

$$F/f3 = 0.129; \tag{1}$$

$$F/f5 = 0.297; \tag{2}$$

$$F/fg1 = -0.279; \tag{3}$$

$$F/fg2 = 0.348; \tag{4}$$

$$F/(f4 + f5 + f6 + f7) = 0.14. \tag{5}$$

With the parameters from Table 1, in the current embodiment, the focal length fg1 of the first lens group G1, the focal length fg2 of the second lens group G2, the focal length f3 of the third lens L3, the focal length f5 of the fifth lens L5, and the focal length of the fourth lens L4 to the seventh lens L7 satisfy the aforementioned conditions (1) to (5) of the optical imaging lens 100.

Additionally, in the current embodiment, the optical imaging lens 100 further satisfies:

$$0 < F/R1 < 0.15; \tag{6}$$

$$0.35 < F/R2 < 0.45; \tag{7}$$

$$0.735 < F/R4 < 0.815; \tag{8}$$

$$-0.65 < F/R11 < -0.55; \tag{9}$$

$$-0.4 < fg1/(R1 + R2 + R3 + R4 + R5 + \tag{10}$$

$$R6 + R8 + R9 + R10 + R11 + R12 + R13 + R14 + R15) < 0;$$

$$0 < fg2/(R1 + R2 + R3 + R4 + R5 + R6 + \tag{11}$$

$$R8 + R9 + R10 + R11 + R12 + R13 + R14 + R15) < 0.3;$$

wherein F is the focal length of the optical imaging lens 100; R1 is a radius of curvature of the object-side surface S1 of the first lens L1; R2 is a radius of curvature of the image-side surface S2 of the first lens L1; R3 is a radius of curvature of the object-side surface S3 of the second lens L2; R4 is a radius of curvature of the image-side surface S4 of the second lens L2; R5 is a radius of curvature of the object-side surface S5 of the third lens L3; R6 is a radius of curvature of the image-side surface S6 of the third lens L3; R8 is a radius of curvature of the object-side surface S8 of the fourth lens L4; R9 is a radius of curvature of the image-side surface S9 of the fourth lens L4; R10 is a radius of curvature of the object-side surface S10 of the fifth lens L5; R11 is a radius of curvature of the image-side surface S11 of the fifth lens L5; R12 is a radius of curvature of the object-side surface S12 of the sixth lens L6; R13 is a radius of curvature of the image-side surface S13 of the sixth lens L6; R14 is a radius of curvature of the object-side surface S14 of the seventh lens L7; R15 is a radius of curvature of the image-side surface S15 of the seventh lens L7; fg1 is the focal length of the first lens assembly G1; fg2 is the focal length of the second lens assembly G2.

Based on the detailed parameters of Table 1, the aforementioned conditions (6) to (11) include a ratio of the focal length F of the optical imaging lens 100 to the radius of curvature R1 of the object-side surface S1 of the first lens L1, a ratio of the focal length F of the optical imaging lens 100 to the radius of curvature R2 of the image-side surface S2 of the first lens L1, a ratio of the focal length F of the optical imaging lens 100 to the radius of curvature R4 of the image-side surface S4 of the second lens L2, a ratio of the focal length F of the optical imaging lens 100 to the radius of curvature R11 of the image-side surface S11 of the fifth lens L5, a ratio of the focal length fg1 of the first lens group G1 to a sum of the radius of curvature of the first lens L1 to the seventh lens L7, and a ratio of the focal length fg2 of the second lens group G2 to the sum of the radius of curvature of the first lens L1 to the seventh lens L7; detailed values of the aforementioned conditions (6) to (11) in the first embodiment are as follows:

$$F/R1 = 0.097; \tag{6}$$

$$F/R2 = 0.363; \tag{7}$$

$$F/R4 = 0.742; \tag{8}$$

$$F/R11 = -0.562; \tag{9}$$

$$fg1/(R1 + R2 + R3 + R4 + R5 + R6 + \tag{10}$$

$$R8 + R9 + R10 + R11 + R12 + R13 + R14 + R15) = -0.32;$$

$$fg2/(R1 + R2 + R3 + R4 + R5 + R6 + \tag{11}$$

$$R8 + R9 + R10 + R11 + R12 + R13 + R14 + R15) = 0.26.$$

With the parameters from Table 1, in the current embodiment, the radius of curvature R1 of the object-side surface S1 of the first lens L1, the radius of curvature R2 of the image-side surface S2 of the first lens L1, the radius of curvature R4 of the image-side surface S4 of the second lens L2, the radius of curvature R11 of the image-side surface S11 of the fifth lens L5, and the sum of the radius of curvature of the first lens L1 to the seventh lens L7 satisfy the aforementioned conditions (6) to (11) of the optical imaging lens 100.

Moreover, an aspheric surface contour shape Z of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, the image-side surface S13 of the sixth lens L6, the object-side surface S14 of the seventh lens L7, and the image-side surface S15 of the seventh lens L7 of the optical imaging lens 100 according to the first embodiment could be obtained by following formula:

$$Z = \frac{ch^2}{1 + \sqrt{1 - (1+k)c^2h^2}} + A_2h^2 +$$
$$A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, and A14 respectively represents different order coefficient of h.

In the optical imaging lens 100 according to the first embodiment, the conic constant k of each of the aspheric surfaces and the different order coefficient of A2, A4, A6, A8, A10, A12, and A14 are listed in following Table 2:

TABLE 2

| Surface | S3 | S4 | S5 |
|---|---|---|---|
| k | 52.0327941 | −3.13058721 | −90 |
| A2 | 0 | 0 | 0 |
| A4 | 0.007670485 | 0.054852749 | −0.008423326 |
| A6 | −0.000867631 | −0.00637412 | 0.002462481 |
| A8 | 4.23266E−05 | 0.002476259 | −0.00096878 |
| A10 | −6.73222E−07 | −0.000389789 | 9.02931E−05 |
| A12 | 0 | 0 | 0 |
| A14 | 0 | 0 | 0 |

| Surface | S6 | S10 | S11 |
|---|---|---|---|
| k | −3.32863118 | 90 | −0.610735133 |
| A2 | 0 | 0 | 0 |
| A4 | −0.001671898 | −0.005861049 | 0.033200772 |
| A6 | 0.001169652 | −0.003658616 | −0.018759273 |
| A8 | −0.000417206 | 0.00011917 | 0.010471719 |
| A10 | 0.000180069 | −0.000363293 | −0.007217352 |
| A12 | 0 | 0 | 0.0022552 |
| A14 | 0 | 0 | −0.00024661 |

| Surface | S12 | S13 | S14 | S15 |
|---|---|---|---|---|
| k | 53.6772431 | −3.15778476 | −19.821689 | −0.890027348 |
| A2 | 0 | 0 | 0 | 0 |
| A4 | −0.078735358 | −0.059038914 | 0.032902967 | 0.015663942 |
| A6 | 0.020073583 | 0.032836589 | −0.013057913 | −0.002426491 |
| A8 | 0.006491456 | −0.011411495 | 0.003831757 | 0.001495081 |
| A10 | −0.009535763 | 0.002454384 | −0.000730028 | −0.000449465 |
| A12 | 0.0033998 | −0.00028878 | 0.000082452 | 0.000071652 |
| A14 | −0.00038882 | 0.000013965 | −0.000004155 | −4.3994E−06 |

Figure 1B:
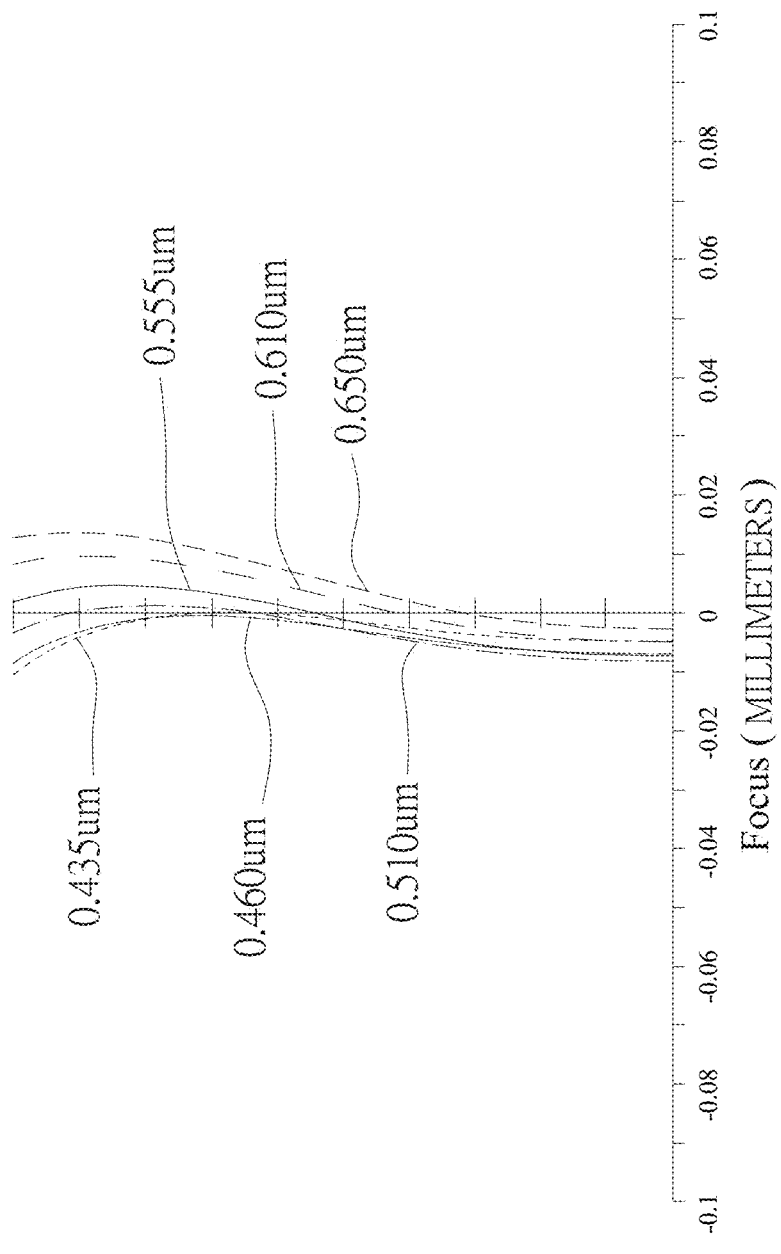
FIG. 1B is a diagram showing the longitudinal chromatic aberration of the optical imaging lens according to the first embodiment of the present invention.

Taking optical simulation data to verify the imaging quality of the optical imaging lens 100, wherein FIG. 1B is a diagram showing the longitudinal chromatic aberration according to the first embodiment. From FIG. 1B, it could be observed that the curves formed by each wavelength are close to one another, thereby significantly enhancing chromatic aberration. The skewness of each curve shows that the deviation of the imaging point of the off-axis rays is controlled within the range of +0.02 millimeters. Therefore, in the first embodiment, chromatic aberration for different wavelengths could be significantly improved.

Figure 1C:
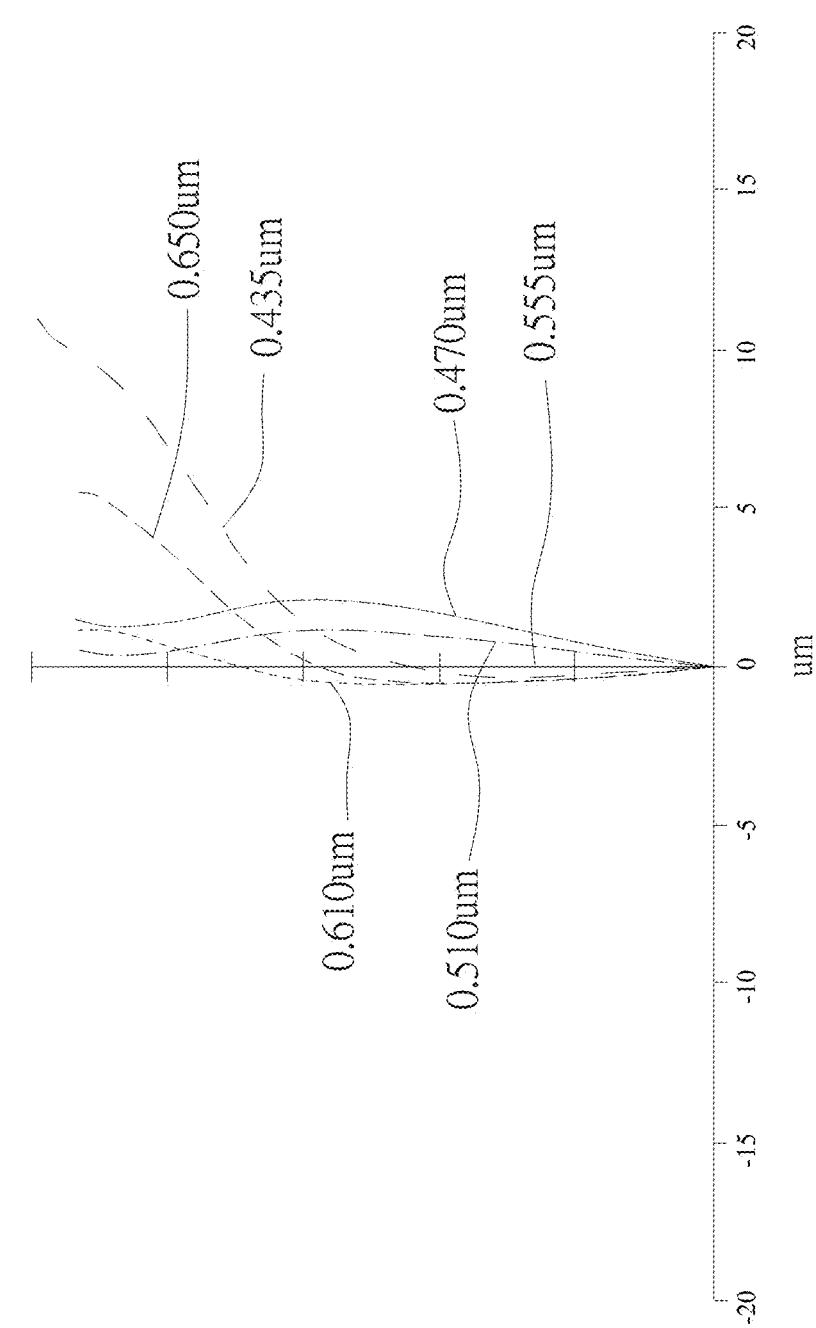
FIG. 1C is a diagram showing the lateral chromatic aberration of the optical imaging lens according to the first embodiment of the present invention.

The lateral chromatic aberration according to the first embodiment is illustrated in FIG. 1C. From FIG. 1C, it could be observed that at a maximum angle of view of 98.0000 degrees, and the lateral chromatic aberration values range from −5 micrometers to 15 micrometers, indicating that the optical imaging lens 100 is capable of effectively correcting the lateral chromatic aberration, thereby achieving a better image quality.

Figure 2A:
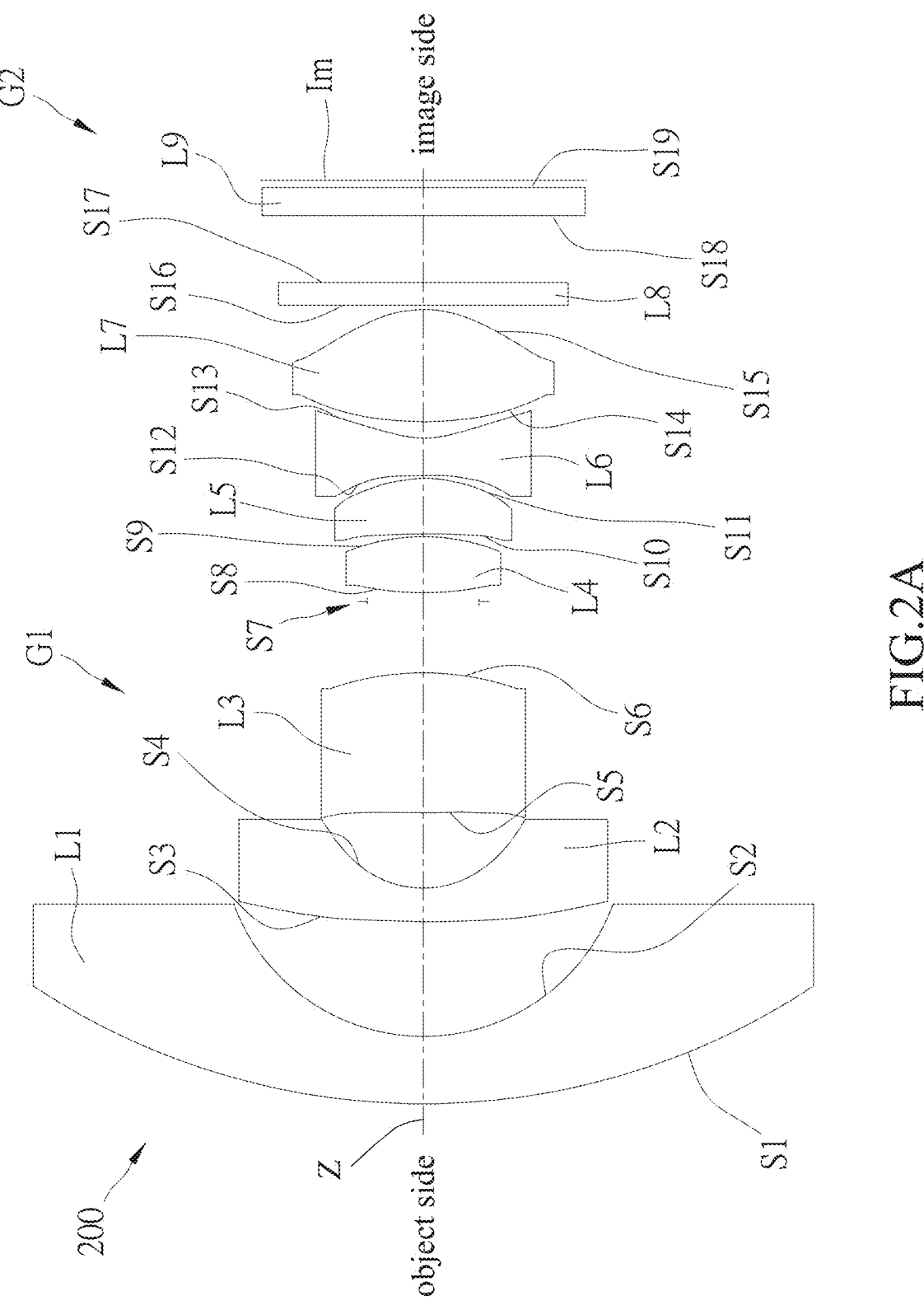
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first lens assembly G1, an aperture S7, and a second lens assembly G2. In the current embodiment, the optical imaging lens 200 includes at least seven lenses, wherein the first lens assembly G1 consists of, in order along the optical axis Z from the object side to the image side, a first lens L1, a second lens L2, and a third lens L3. The second lens assembly G2 consists of, in order along the optical axis Z from the object side to the image side, a fourth lens L4, a fifth lens L5, a sixth lens L6, and a seventh lens L7. In the current embodiment, an air space is provided between any two adjacent lenses from the first lens L1 to the seventh lens L7 along the optical axis, which means that each of the lenses from the first lens L1 to the seventh lens L7 is a single lens, and no two adjacent lenses from the first lens L1 to the seventh lens L7 are adhered to form a compound lens.

The first lens L1 has negative refractive power; an object-side surface S1 of the first lens L1 is a convex surface, and an image-side surface S2 of the first lens L1 is a concave surface; both of the object-side surface S1 and the image-side surface S2 of the first lens L1 are spherical surfaces.

The second lens L2 has negative refractive power; an object-side surface S3 of the second lens L2 is a convex surface, and an image-side surface S4 of the second lens L2 is a concave surface; both of the object-side surface S3 and the image-side surface S4 of the second lens L2 are aspheric surfaces.

The third lens L3 is a biconvex lens with positive refractive power; both of an object-side surface S5 and an image-side surface S6 of the third lens L3 are aspheric surfaces; in the second embodiment, the object-side surface S5 of the third lens L3 has at least one inflection point.

The fourth lens L4 is a biconvex lens with positive refractive power; both of an object-side surface S8 and an image-side surface S9 of the fourth lens L4 are spherical surfaces.

The fifth lens L5 has positive refractive power; an object-side surface S10 of the fifth lens L5 is a concave surface, and an image-side surface S11 of the fifth lens L5 is a convex surface; both of the object-side surface S10 and the image-side surface S11 of the fifth lens L5 are aspheric surfaces.

The sixth lens L6 is a biconcave lens with negative refractive power; both of an object-side surface S12 and an image-side surface S13 of the sixth lens L6 are aspheric surfaces.

The seventh lens L7 is a biconvex lens with positive refractive power; both of an object-side surface S14 and an image-side surface S15 of the seventh lens L7 are aspheric surfaces.

Additionally, the optical imaging lens 200 further includes an infrared filter L8 and a protective glass L9, wherein the infrared filter L8 forms an object-side surface S16 and an image-side surface S17. The infrared filter L8 is disposed on one side of the image-side surface S15 of the seventh lens L7, thereby restricting infrared rays passing through the optical imaging lens 200 to improve the quality and fidelity of the image. The protective glass L9 forms an object-side surface S18 and an image-side surface S19. The protective glass L9 is disposed between the infrared filter L8 and an image plane Im to protect the infrared filter L8.

In order to keep the optical imaging lens 200 in good optical performance and high imaging quality, in the current embodiment, the optical imaging lens 200 further satisfies:

$$0.1 < F / f3 < 0.3; \tag{1}$$

$$0.2 < F / f5 < 0.5; \tag{2}$$

$$-0.7 < F / fg1 < -0.01; \tag{3}$$

$$0.2 < F / fg2 < 0.5; \tag{4}$$

$$0.1 < F / (f4 + f5 + f6 + f7) < 0.2; \tag{5}$$

wherein F is a focal length of the optical imaging lens 200; f3 is a focal length of the third lens L3; f4 is a focal length of the fourth lens L4; f5 is a focal length of the fifth lens L5; f6 is a focal length of the sixth lens L6; f7 is a focal length of the seventh lens L7; fg1 is a focal length of the first lens assembly G1; fg2 is a focal length of the second lens assembly G2.

Parameters of the optical imaging lens 200 of the second embodiment of the present invention are listed in following Table 3, including the focal length F of the optical imaging lens 200 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 3

| F = 1.37 mm; Fno = 2.05; FOV = 195.00 deg | | | | | | | |
|---|---|---|---|---|---|---|---|
| Surface | R(mm) | D(mm) | Nd | Vd | Focal length | Focal Length | Note |
| S1 | 12.31 | 1.20 | 1.62 | 60.32 | −8.48 | −7.15 | First lens L1 |
| S2 | 3.56 | 2.04 | | | | | |
| S3 | 39.98 | 0.60 | 1.62 | 60.44 | −2.91 | | Second lens L2 |
| S4 | 1.72 | 1.33 | | | | | |
| S5 | 42.88 | 2.48 | 1.76 | 27.58 | 6.55 | | Third lens L3 |
| S6 | −5.49 | 1.27 | | | | | |
| S7 | INFINITY | 0.15 | | | | | Aperture S7 |
| S8 | 5.12 | 1.00 | 1.55 | 64.46 | 3.96 | 3.78 | Fourth lens L4 |
| S9 | −3.58 | 0.05 | | | | | |
| S10 | −21.00 | 0.98 | 1.62 | 60.32 | 4.06 | | Fifth lens L5 |
| S11 | −2.29 | 0.05 | | | | | |
| S12 | −13.69 | 0.67 | 1.76 | 27.58 | −2.09 | | Sixth lens L6 |
| S13 | 1.84 | 0.29 | | | | | |

10

TABLE 3-continued

| F = 1.37 mm; Fno = 2.05; FOV = 195.00 deg | | | | | | | |
|---|---|---|---|---|---|---|---|
| Surface | R(mm) | D(mm) | Nd | Vd | Focal length | Focal Length | Note |
| S14 | 7.91 | 1.99 | 1.50 | 69.10 | 3.32 | | Sevnth lens L7 |
| S15 | −1.93 | 0.08 | | | | | |
| S16 | INFINITY | 0.40 | 1.52 | 64.17 | | | Infrared Filter L8 |
| S17 | INFINITY | 1.19 | | | | | |
| S18 | INFINITY | 0.50 | 1.52 | 64.17 | | | Protective Glass L9 |
| S19 | INFINITY | 0.13 | | | | | |
| Im | INFINITY | | | | | | Image Plane Im |

It could be seen from Table 3 that, in the current embodiment, the focal length F of the optical imaging lens 200 is 1.37 mm, and the Fno is 2.05, and the FOV is 195.00 degrees, wherein a focal length f1 of the first lens L1 is −8.48 mm; a focal length f2 of the second lens L2 is −2.91 mm; the focal length f3 of the third lens L3 is 6.55 mm; the focal length f4 of the fourth lens L4 is 3.96 mm; the focal length f5 of the fifth lens L5 is 4.06 mm; the focal length f6 of the sixth lens L6 is −2.09 mm; the focal length f7 of the seventh lens L7 is 3.32 mm; the focal length fg1 of the first lens assembly G1 is −7.15 mm; the focal length fg2 of the second lens assembly G2 is 3.78 mm.

Additionally, based on the above detailed parameters, the aforementioned conditions (1) to (5) include a ratio of the focal length F of the optical imaging lens 200 to the focal length f3 of the third lens L3, a ratio of the focal length F of the optical imaging lens 200 to the focal length f5 of the fifth lens L5, a ratio of the focal length F of the optical imaging lens 200 to the focal length fg1 of the first lens group G1, a ratio of the focal length F of the optical imaging lens 200 to the focal length fg2 of the second lens group G2, and a ratio of the focal length F of the optical imaging lens 200 to the focal length of the fourth lens L4 to the seventh lens L7, detailed values of the aforementioned conditions (1) to (5) in the second embodiment are as follows:

$$F / f3 = 0.209; \tag{1}$$

$$F / f5 = 0.338; \tag{2}$$

$$F / fg1 = -0.192; \tag{3}$$

$$F / fg2 = 0.362; \tag{4}$$

$$F / (f4 + f5 + f6 + f7) = 0.15. \tag{5}$$

With the parameters from Table 3, in the current embodiment, the focal length fg1 of the first lens group G1, the focal length fg2 of the second lens group G2, the focal length f3 of the third lens L3, the focal length f5 of the fifth lens L5, and the focal length of the fourth lens L4 to the seventh lens L7 satisfy the aforementioned conditions (1) to (5) of the optical imaging lens 200.

Additionally, in the current embodiment, the optical imaging lens 200 further satisfies:

$$0 < F / R1 < 0.15; \tag{6}$$

-continued $$0.35 < F/R2 < 0.45; \tag{7}$$

$$0.735 < F/R4 < 0.815; \tag{8}$$

$$-0.65 < F/R11 < -0.55; \tag{9}$$

$$-0.4 < fg1/(R1 + R2 + R3 + R4 + R5 + \tag{10}$$

$$R6 + R8 + R9 + R10 + R11 + R12 + R13 + R14 + R15) < 0;$$

$$0 < fg2/(R1 + R2 + R3 + R4 + R5 + R6 + \tag{11}$$

$$R8 + R9 + R10 + R11 + R12 + R13 + R14 + R15) < 0.3;$$

wherein F is the focal length of the optical imaging lens 200; R1 is a radius of curvature of the object-side surface S1 of the first lens L1; R2 is a radius of curvature of the image-side surface S2 of the first lens L1; R3 is a radius of curvature of the object-side surface S3 of the second lens L2; R4 is a radius of curvature of the image-side surface S4 of the second lens L2; R5 is a radius of curvature of the object-side surface S5 of the third lens L3; R6 is a radius of curvature of the image-side surface S6 of the third lens L3; R8 is a radius of curvature of the object-side surface S8 of the fourth lens L4; R9 is a radius of curvature of the image-side surface S9 of the fourth lens L4; R10 is a radius of curvature of the object-side surface S10 of the fifth lens L5; R11 is the radius of curvature of the image-side surface S11 of the fifth lens L5; R12 is ae radius of curvature of the object-side surface S12 of the sixth lens L6; R13 is a radius of curvature of the image-side surface S13 of the sixth lens L6; R14 is a radius of curvature of the object-side surface S14 of the seventh lens L7; R15 is a radius of curvature of the image-side surface S15 of the seventh lens L7; fg1 is the focal length of the first lens assembly G1; fg2 is the focal length of the second lens assembly G2.

Based on the detailed parameters of Table 3, the aforementioned conditions (6) to (11) include a ratio of the focal length F of the optical imaging lens 200 to the radius of curvature R1 of the object-side surface S1 of the first lens L1, a ratio of the focal length F of the optical imaging lens 200 to the radius of curvature R2 of the image-side surface S2 of the first lens L1, a ratio of the focal length F of the optical imaging lens 200 to the radius of curvature R4 of the image-side surface S4 of the second lens L2, a ratio of the focal length F of the optical imaging lens 200 to the radius of curvature R11 of the image-side surface S11 of the fifth lens L5, a ratio of the focal length fg1 of the first lens group G1 to the sum of the radius of curvature of the first lens L1 to the seventh lens L7, and a ratio of the focal length fg2 of the second lens group G2 to the sum of the radius of curvature of the first lens L1 to the seventh lens L7; detailed values of the aforementioned conditions (6) to (11) in the second embodiment are as follows:

$$F/R1 = 0.111; \tag{6}$$

$$F/R2 = 0.385; \tag{7}$$

$$F/R4 = 0.798; \tag{8}$$

$$F/R11 = -0.597; \tag{9}$$

$$fg1/(R1 + R2 + R3 + R4 + R5 + R6 + \tag{10}$$

$$R8 + R9 + R10 + R11 + R12 + R13 + R14 + R15) = -0.11;$$

$$fg2/(R1 + R2 + R3 + R4 + R5 + R6 + \tag{11}$$

$$R8 + R9 + R10 + R11 + R12 + R13 + R14 + R15) = 0.06.$$

With the parameters from Table 3, in the current embodiment, the radius of curvature R1 of the object-side surface S1 of the first lens L1, the radius of curvature R2 of the image-side surface S2 of the first lens L1, the radius of curvature R4 of the image-side surface S4 of the second lens L2, the radius of curvature R11 of the image-side surface S11 of the fifth lens L5, and the sum of the radius of curvature of the first lens L1 to the seventh lens L7 satisfy the aforementioned conditions (6) to (11) of the optical imaging lens 200.

Moreover, an aspheric surface contour shape Z of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, the image-side surface S13 of the sixth lens L6, the object-side surface S14 of the seventh lens L7, and the image-side surface S15 of the seventh lens L7 of the optical imaging lens 200 according to the second embodiment could be obtained by following formula:

$$Z = \frac{ch^2}{1 + \sqrt{1 - (1+k)c^2 h^2}} + A_2 h^2 +$$
$$A_4 h^4 + A_6 h^6 + A_8 h^8 + A_{10} h^{10} + A_{12} h^{12} + A_{14} h^{14} + A_{16} h^{16}$$

wherein Z is aspheric surface contour shape; c is reciprocal of radius of curvature; h is half the off-axis height of the surface; k is conic constant; A2, A4, A6, A8, A10, A12, and A14 respectively represents different order coefficient of h.

In the optical imaging lens 200 according to the second embodiment, the conic constant k of each of the aspheric surfaces and the different order coefficient of A2, A4, A6, A8, A10, A12, and A14 are listed in following Table 4:

TABLE 4

| Surface | S3 | S4 | S5 |
|---|---|---|---|
| k | −90 | −2.65079898 | 88.2496246 |
| A2 | 0 | 0 | 0 |
| A4 | 0.007049226 | 0.057099828 | −0.010712201 |
| A6 | −0.000877702 | −0.00578931 | 0.002197686 |
| A8 | 4.34812E−05 | 0.00259162 | −0.001232619 |
| A10 | −3.93861E−07 | −0.000478161 | 0.000100259 |
| A12 | 0 | 0 | 0 |
| A14 | 0 | 0 | 0 |

TABLE 4-continued

| Surface | S6 | S10 | S11 |
|---|---|---|---|
| k | 0.185826416 | 90 | −0.728113477 |
| A2 | 0 | 0 | 0 |
| A4 | −0.0032496 | −0.004404998 | 0.035353402 |
| A6 | −0.00080893 | −0.002951946 | −0.019641683 |
| A8 | 0.000298456 | −0.000669744 | 0.010272119 |
| A10 | −1.55779E−05 | −0.000346004 | −0.007264315 |
| A12 | 0 | 0 | 0.0022552 |
| A14 | 0 | 0 | −0.00024661 |

| Surface | S12 | S13 | S14 | S15 |
|---|---|---|---|---|
| k | 47.1818682 | −3.33484525 | −18.9570205 | −0.913236095 |
| A2 | 0 | 0 | 0 | 0 |
| A4 | −0.079783704 | −0.059572865 | 0.032537766 | 0.016096509 |
| A6 | 0.02019268 | 0.032880019 | −0.01308568 | −0.002424144 |
| A8 | 0.006307094 | −0.011435317 | 0.003845191 | 0.00150836 |
| A10 | −0.009574562 | 0.002444895 | −0.000729329 | −0.000445108 |
| A12 | 0.0033998 | −0.00028878 | 0.000082452 | 0.000071652 |
| A14 | −0.00038882 | 0.000013965 | −0.000004155 | −4.3994E−06 |

Figure 2B:
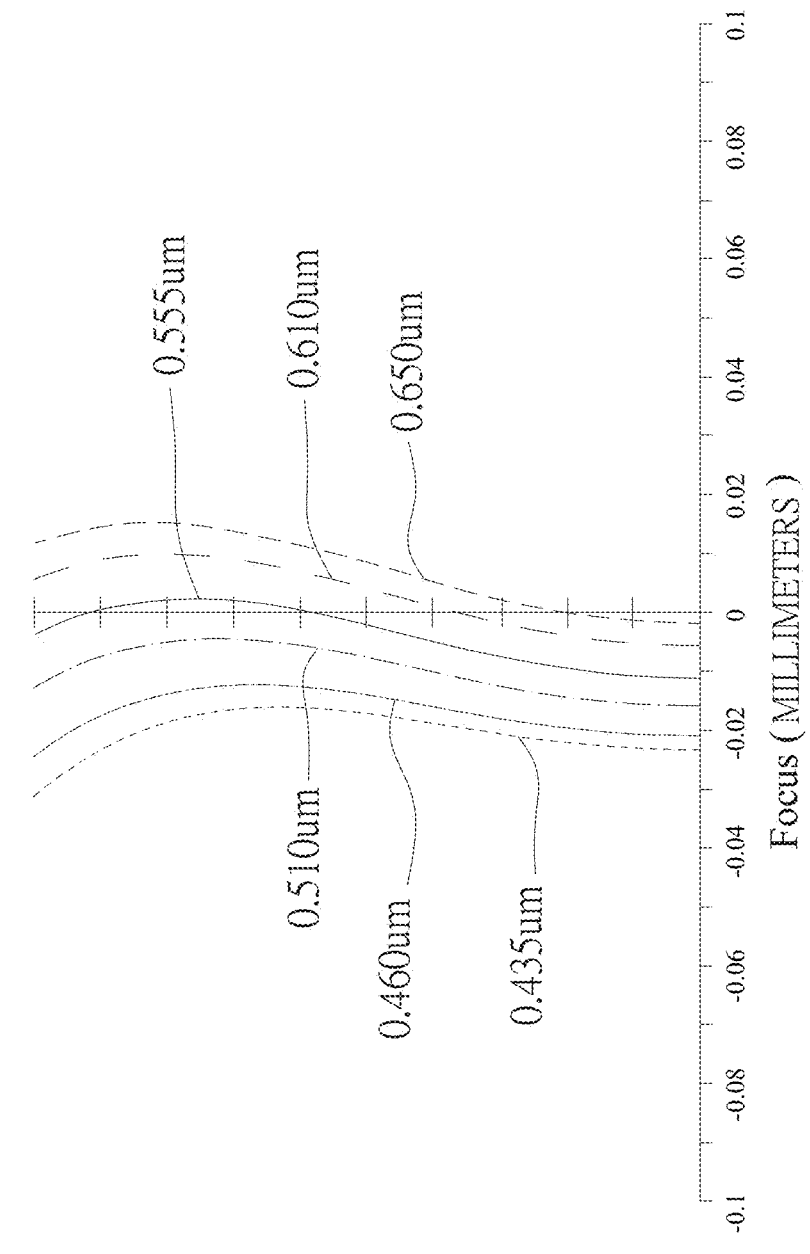
FIG. 2B is a diagram showing the longitudinal chromatic aberration of the optical imaging lens according to the second embodiment of the present invention.

Taking optical simulation data to verify the imaging quality of the optical imaging lens 200, wherein FIG. 2B is a diagram showing the longitudinal chromatic aberration according to the second embodiment. From FIG. 2B, it could be observed that the curves formed by each wavelength are close to one another, thereby significantly enhancing chromatic aberration. The skewness of each curve shows that the deviation of the imaging point of the off-axis rays is controlled within the range of +0.04 millimeters. Therefore, in the second embodiment, chromatic aberration for different wavelengths could be significantly improved.

Figure 2C:
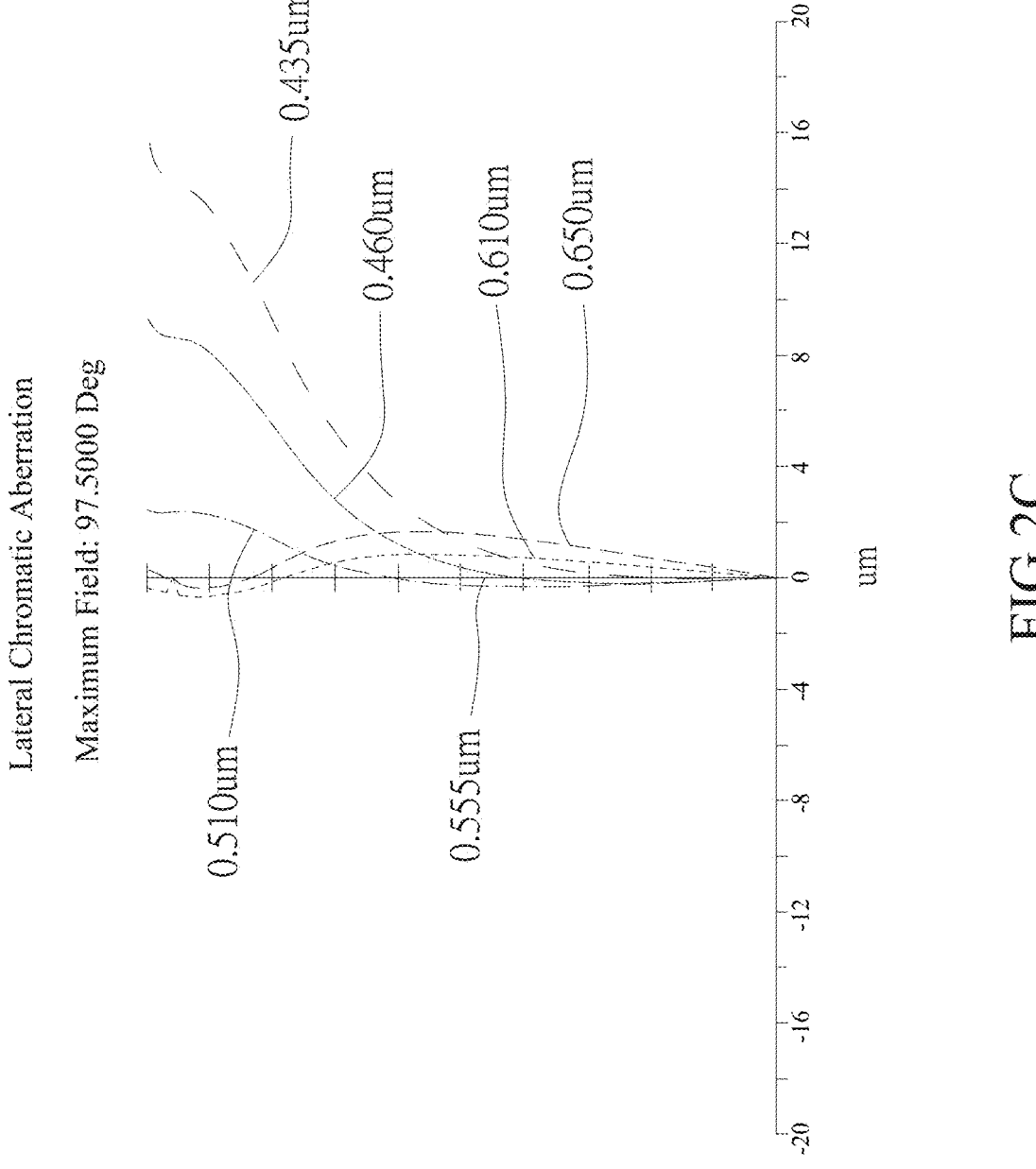
FIG. 2C is a diagram showing the lateral chromatic aberration of the optical imaging lens according to the second embodiment of the present invention.

The lateral chromatic aberration according to the second embodiment is illustrated in FIG. 2C. From FIG. 2C, it could be observed that at a maximum angle of view of 97.5000 degrees, and the lateral chromatic aberration values range from −2 micrometers to 16 micrometers, indicating that the optical imaging lens 200 is capable of effectively correcting the lateral chromatic aberration, thereby achieving better image quality.

Figure 3A:
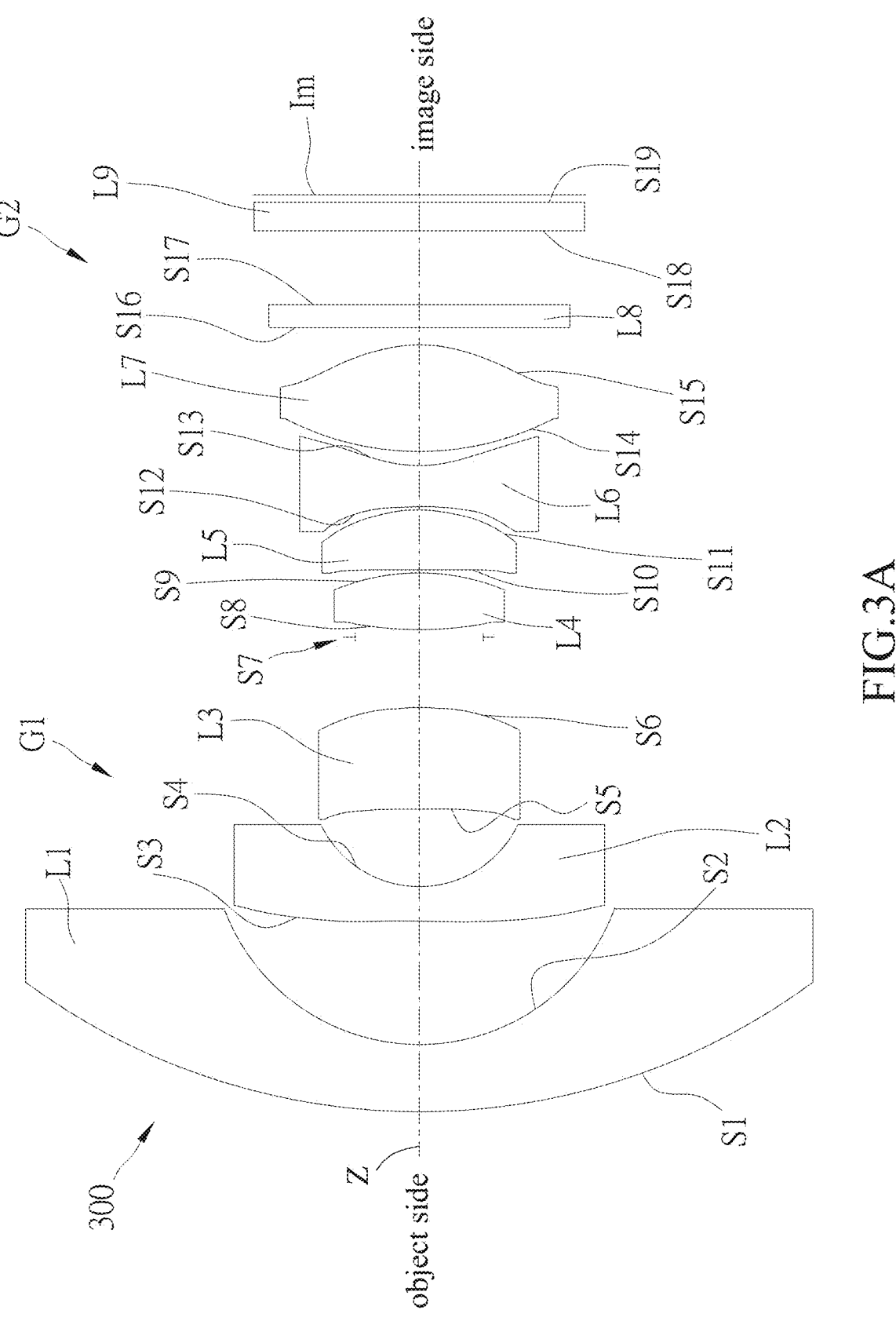
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first lens assembly G1, an aperture S7, and a second lens assembly G2. In the current embodiment, the optical imaging lens 300 includes at least seven lenses, wherein the first lens assembly G1 consists of, in order along the optical axis Z from the object side to the image side, a first lens L1, a second lens L2, and a third lens L3. The second lens assembly G2 consists of, in order along the optical axis Z from the object side to the image side, a fourth lens L4, a fifth lens L5, a sixth lens L6, and a seventh lens L7. In the current embodiment, an air space is provided between any two adjacent lenses from the first lens L1 to the seventh lens L7 along the optical axis, which means that each of the lenses from the first lens L1 to the seventh lens L7 is a single lens, and no two adjacent lenses from the first lens L1 to the seventh lens L7 are adhered to form a compound lens.

The first lens L1 has negative refractive power; an object-side surface S1 of the first lens L1 is a convex surface, and an image-side surface S2 of the first lens L1 is a concave surface; both of the object-side surface S1 and the image-side surface S2 of the first lens L1 are spherical surfaces.

The second lens L2 is a biconcave lens with negative refractive power; both of an object-side surface S3 and an image-side surface S4 of the second lens L2 are aspheric surfaces; in the third embodiment, the object-side surface S3 of the second lens L2 has at least one inflection point.

The third lens L3 has positive refractive power; an object-side surface S5 of the third lens L3 is a concave surface, and an image-side surface S6 of the third lens L3 is a convex surface; both of the object-side surface S5 and the image-side surface S6 of the third lens L3 are aspheric surfaces.

The fourth lens L4 is a biconvex lens with positive refractive power; both of an object-side surface S8 and an image-side surface S9 of the fourth lens L4 are spherical surfaces.

The fifth lens L5 is a biconvex lens with positive refractive power; both of an object-side surface S10 and an image-side surface S11 of the fifth lens L5 are aspheric surfaces.

The sixth lens L6 is a biconcave lens with negative refractive power; both of an object-side surface S12 and an image-side surface S13 of the sixth lens L6 are aspheric surfaces.

The seventh lens L7 is a biconvex lens with positive refractive power; both of an object-side surface S14 and an image-side surface S15 of the seventh lens L7 are aspheric surfaces.

Additionally, the optical imaging lens 300 further includes an infrared filter L8 and a protective glass L9, wherein the infrared filter L8 forms an object-side surface S16 and an image-side surface S17. The infrared filter L8 is disposed on one side of the image-side surface S15 of the seventh lens L7, thereby restricting infrared rays passing through the optical imaging lens 300 to improve the quality and fidelity of the image. The protective glass L9 forms an object-side surface S18 and an image-side surface S19. The protective glass L9 is disposed between the infrared filter L8 and an image plane Im to protect the infrared filter L8.

In order to keep the optical imaging lens 300 in good optical performance and high imaging quality, in the current embodiment, the optical imaging lens 300 further satisfies:

$$0.1 < F/f3 < 0.3; \tag{1}$$

$$0.2 < F/f5 < 0.5; \tag{2}$$

$$-0.7 < F/fg1 < -0.01; \tag{3}$$

-continued $$0.2 < F / fg2 < 0.5; \tag{4}$$

$$0.1 < F / (f4 + f5 + f6 + f7) < 0.2; \tag{5}$$

wherein F is a focal length of the optical imaging lens 300; f3 is a focal length of the third lens L3; f4 is a focal length of the fourth lens L4; f5 is a focal length of the fifth lens L5; f6 is a focal length of the sixth lens L6; f7 is a focal length of the seventh lens L7; fg1 is a focal length of the first lens assembly G1; fg2 is a focal length of the second lens assembly G2.

Parameters of the optical imaging lens 300 of the third embodiment of the present invention are listed in following Table 5, including the focal length F of the optical imaging lens 300 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 5

| Sur-face | R(mm) | D(mm) | Nd | Vd | Focal length | Focal Length | Note |
|---|---|---|---|---|---|---|---|
| S1 | 11.36 | 1.20 | 1.61 | 60.63 | −9.05 | −6.89 | First lens L1 |
| S2 | 3.59 | 2.12 | | | | | |
| S3 | −42.97 | 0.60 | 1.62 | 60.32 | −3.05 | | Second lens L2 |
| S4 | 2.00 | 1.35 | | | | | |
| S5 | −70.08 | 1.77 | 1.76 | 27.57 | 6.73 | | Third lens L3 |
| S6 | −4.82 | 1.23 | | | | | |
| S7 | INFINITY | 0.12 | | | | | Aperture S7 |
| S8 | 5.98 | 1.00 | 1.53 | 66.49 | 4.49 | 3.88 | Fourth lens L4 |
| S9 | −3.71 | 0.05 | | | | | |
| S10 | 731.20 | 1.04 | 1.62 | 60.32 | 3.97 | | Fifth lens L5 |
| S11 | −2.47 | 0.05 | | | | | |
| S12 | −13.89 | 0.72 | 1.76 | 27.58 | −2.15 | | Sixth lens L6 |
| S13 | 1.89 | 0.24 | | | | | |
| S14 | 6.68 | 1.86 | 1.55 | 64.88 | 3.66 | | Sevnth lens L7 |
| S15 | −2.59 | 0.30 | | | | | |
| S16 | INFINITY | 0.40 | 1.52 | 64.17 | | | Infrared Filter L8 |
| S17 | INFINITY | 1.29 | | | | | |
| S18 | INFINITY | 0.50 | 1.52 | 64.17 | | | Pro-tective Glass L9 |
| S19 | INFINITY | 0.13 | | | | | |
| Im | INFINITY | | | | | | Image Plane Im |

F = 1.60 mm; Fno = 2.00; FOV = 195.00 deg

It could be seen from Table 5 that, in the current embodiment, the focal length F of the optical imaging lens 300 is 1.60 mm, and the Fno is 2.00, and the FOV is 195.00 degrees, wherein a focal length f1 of the first lens L1 is −9.05 mm; a focal length f2 of the second lens L2 is −3.05 mm; the focal length f3 of the third lens L3 is 6.73 mm; the focal length f4 of the fourth lens L4 is 4.49 mm; the focal length f5 of the fifth lens L5 is 3.97 mm; the focal length f6 of the sixth lens L6 is −2.15 mm; the focal length f7 of the seventh lens L7 is 3.66 mm; the focal length fg1 of the first lens assembly G1 is −6.89 mm; the focal length fg2 of the second lens assembly G2 is 3.88 mm.

Additionally, based on the above detailed parameters, the aforementioned conditions (1) to (5) include a ratio of the focal length F of the optical imaging lens 300 to the focal length f3 of the third lens L3, a ratio of the focal length F of the optical imaging lens 300 to the focal length f5 of the fifth lens L5, a ratio of the focal length F of the optical imaging lens 300 to the focal length fg1 of the first lens group G1, a ratio of the focal length F of the optical imaging lens 300 to the focal length fg2 of the second lens group G2, and a ratio of the focal length F of the optical imaging lens 300 to the focal length of the fourth lens L4 to the seventh lens L7; detailed values of the aforementioned conditions (1) to (5) in the third embodiment are as follows:

$$F / f3 = 0.238; \tag{1}$$

$$F / f5 = 0.403; \tag{2}$$

$$F / fg1 = -0.232; \tag{3}$$

$$F / fg2 = 0.412; \tag{4}$$

$$F / (f4 + f5 + f6 + f7) = 0.16. \tag{5}$$

With the parameters from Table 5, in the current embodiment, the focal length fg1 of the first lens group G1, the focal length fg2 of the second lens group G2, the focal length f3 of the third lens L3, the focal length f5 of the fifth lens L5, and the focal length of the fourth lens L4 to the seventh lens L7 satisfy the aforementioned conditions (1) to (5) of the optical imaging lens 300.

Additionally, in the current embodiment, the optical imaging lens 300 further satisfies:

$$0 < F / R1 < 0.15; \tag{6}$$

$$0.35 < F / R2 < 0.45; \tag{7}$$

$$0.735 < F / R4 < 0.815; \tag{8}$$

$$-0.65 < F / R11 < -0.55; \tag{9}$$

$$-0.4 < fg1 / (R1 + R2 + R3 + R4 + R5 + \tag{10}$$

$$R6 + R8 + R9 + R10 + R11 + R12 + R13 + R14 + R15) < 0; \tag{11}$$

$$0 < fg2 / (R1 + R2 + R3 + R4 + R5 +$$

$$R6 + R8 + R9 + R10 + R11 + R12 + R13 + R14 + R15) < 0.3;$$

wherein F is the focal length of the optical imaging lens 300; R1 is a radius of curvature of the object-side surface S1 of the first lens L1; R2 is a radius of curvature of the image-side surface S2 of the first lens L1; R3 is a radius of curvature of the object-side surface S3 of the second lens L2; R4 is a radius of curvature of the image-side surface S4 of the second lens L2; R5 is a radius of curvature of the object-side surface S5 of the third lens L3; R6 is a radius of curvature of the image-side surface S6 of the third lens L3; R8 is a radius of curvature of the object-side surface S8 of the fourth lens L4; R9 is a radius of curvature of the image-side surface S9 of the fourth lens L4; R10 is a radius of curvature of the object-side surface S10 of the fifth lens L5; R11 is a radius of curvature of the image-side surface S11 of the fifth lens L5; R12 is the radius of curvature of the object-side surface S12 of the sixth lens L6; R13 is a radius of curvature of the image-side surface S13 of the sixth lens L6; R14 is a radius of curvature of the object-side surface S14 of the seventh lens L7; R15 is a radius of curvature of the image-side surface S15 of the seventh lens L7; fg1 is the focal length of the first lens assembly G1; fg2 is the focal length of the second lens assembly G2.

Based on the detailed parameters of Table 5, the afore-mentioned conditions (6) to (11) include a ratio of the focal length F of the optical imaging lens 300 to the radius of curvature R1 of the object-side surface S1 of the first lens L1, a ratio of the focal length F of the optical imaging lens 300 to the radius of curvature R2 of the image-side surface S2 of the first lens L1, a ratio of the focal length F of the optical imaging lens 300 to the radius of curvature R4 of the image-side surface S4 of the second lens L2, a ratio of the focal length F of the optical imaging lens 300 to the radius of curvature R11 of the image-side surface S11 of the fifth lens L5, a ratio of the focal length fg1 of the first lens group G1 to the sum of the radius of curvature of the first lens L1 to the seventh lens L7, and a ratio of the focal length fg2 of the second lens group G2 to the sum of the radius of curvature of the first lens L1 to the seventh lens L7; detailed values of the aforementioned conditions (6) to (11) in the third embodiment are as follows:

$$F/R1 = 0.141; \tag{6}$$

$$F/R2 = 0.446; \tag{7}$$

$$F/R4 = 0.801; \tag{8}$$

$$F/R11 = -0.646; \tag{9}$$

$$fg1/(R1 + R2 + R3 + R4 + R5 + R6 + \tag{10}$$

$$R8 + R9 + R10 + R11 + R12 + R13 + R14 + R15) = -0.01;$$

-continued $$fg2/(R1 + R2 + R3 + R4 + R5 + R6 + \tag{11}$$

$$R8 + R9 + R10 + R11 + R12 + R13 + R14 + R15) = 0.01.$$

With the parameters from Table 5, in the current embodi-ment, the radius of curvature R1 of the object-side surface S1 of the first lens L1, the radius of curvature R2 of the image-side surface S2 of the first lens L1, the radius of curvature R4 of the image-side surface S4 of the second lens L2, the radius of curvature R11 of the image-side surface S11 of the fifth lens L5, and the sum of the radius of curvature of the first lens L1 to the seventh lens L7 satisfy the aforementioned conditions (6) to (11) of the optical imaging lens 300.

Moreover, an aspheric surface contour shape Z of each of the object-side surface S3 of the second lens L2, the image-side surface S4 of the second lens L2, the object-side surface S5 of the third lens L3, the image-side surface S6 of the third lens L3, the object-side surface S10 of the fifth lens L5, the image-side surface S11 of the fifth lens L5, the object-side surface S12 of the sixth lens L6, the image-side surface S13 of the sixth lens L6, the object-side surface S14 of the seventh lens L7, and the image-side surface S15 of the seventh lens L7 of the optical imaging lens 300 according to the third embodiment could be obtained by following for-mula:

$$Z = \frac{ch^2}{1 + \sqrt{1 - (1+k)c^2h^2}} + A_2h^2 +$$

$$A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, and A14 respectively represents different order coefficient of h.

In the optical imaging lens 300 according to the third embodiment, the conic constant k of each of the aspheric surfaces and the different order coefficient of A2, A4, A6, A8, A10, A12, and A14 are listed in following Table 6:

TABLE 6

| Surface | S3 | S4 | S5 |
| --- | --- | --- | --- |
| k | −79.5268066 | −3.01613013 | 59.3943289 |
| A2 | 0 | 0 | 0 |
| A4 | 0.00892641 | 0.054415827 | −0.016225401 |
| A6 | −0.00088454 | −0.00261442 | 0.001156351 |
| A8 | 3.93255E−05 | 0.001956074 | −0.000937834 |
| A10 | −2.60883E−07 | −1.19888E−05 | −5.53173E−05 |
| A12 | 0 | 0 | 0 |
| A14 | 0 | 0 | 0 |

| Surface | S6 | S10 | S11 |
| --- | --- | --- | --- |
| k | 1.43961656 | 90 | −0.555243651 |
| A2 | 0 | 0 | 0 |
| A4 | −0.006230186 | 0.000401344 | 0.035328748 |
| A6 | −0.000164085 | −0.00422131 | −0.017168152 |
| A8 | −0.000109085 | 0.000595684 | 0.010320882 |
| A10 | 3.96875E−05 | −0.000330523 | −0.007264331 |
| A12 | 0 | 0 | 0.0022552 |
| A14 | 0 | 0 | −0.00024661 |

TABLE 6-continued

| Surface | S12 | S13 | S14 | S15 |
|---|---|---|---|---|
| k | 46.7693001 | −3.11249773 | −17.6383041 | −0.708570917 |
| A2 | 0 | 0 | 0 | 0 |
| A4 | −0.073497764 | −0.060094842 | 0.032006766 | 0.010228864 |
| A6 | 0.018808311 | 0.03260842 | −0.013081178 | −0.001865801 |
| A8 | 0.006416221 | −0.011442781 | 0.003844563 | 0.001465608 |
| A10 | −0.009596024 | 0.002453874 | −0.00072872 | −0.000446493 |
| A12 | 0.0033998 | −0.00028878 | 0.000082452 | 0.000071652 |
| A14 | −0.00038882 | 0.000013965 | −0.000004155 | −4.3994E−06 |

Figure 3B:
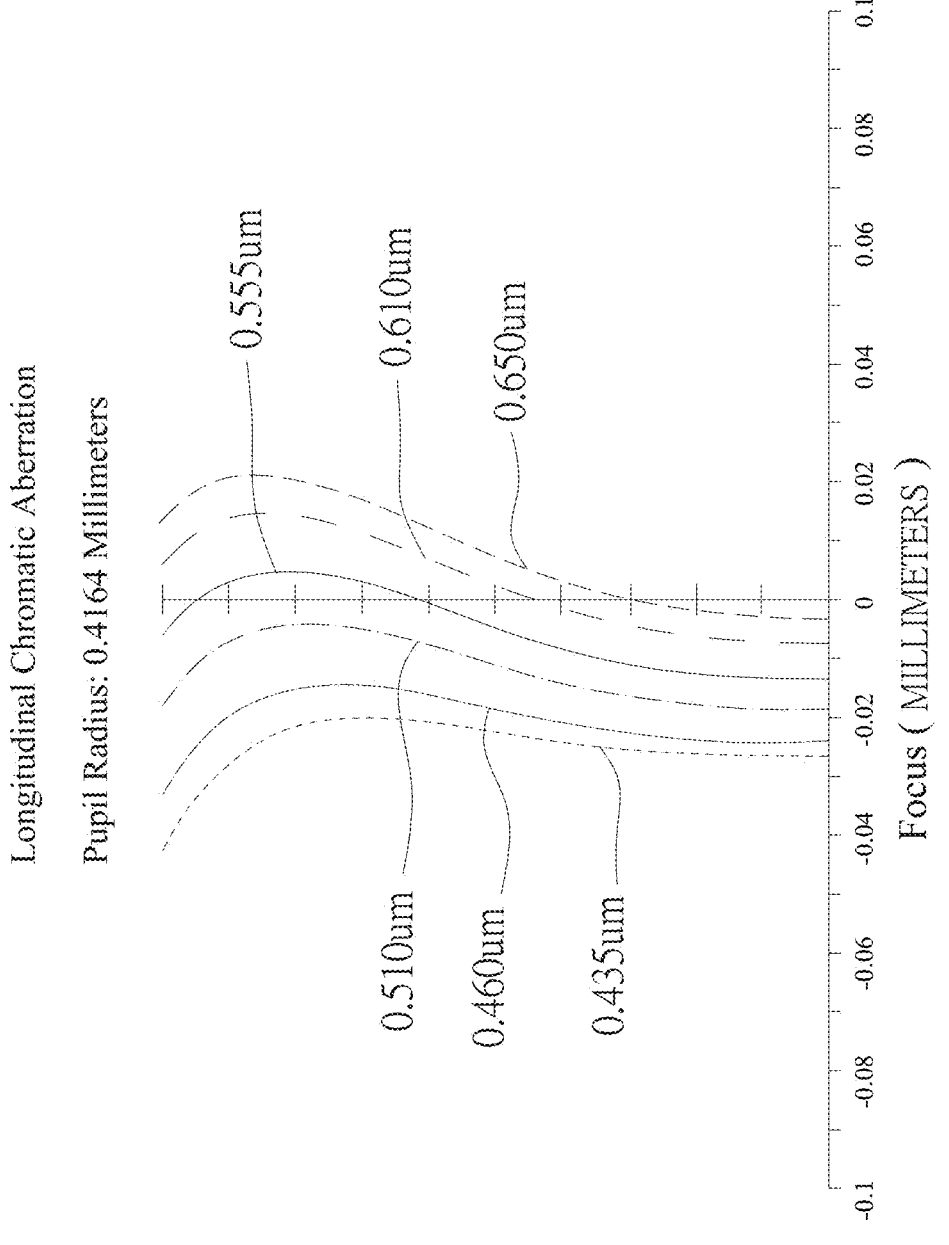
FIG. 3B is a diagram showing the longitudinal chromatic aberration of the optical imaging lens according to the third embodiment of the present invention.

Taking optical simulation data to verify the imaging quality of the optical imaging lens 300, wherein FIG. 3B is a diagram showing the longitudinal chromatic aberration according to the third embodiment. From the FIG. 3B, it could be observed that the curves formed by each wavelength are close to one another, thereby significantly enhancing chromatic aberration. The skewness of each curve shows that the deviation of the imaging point of the off-axis rays is controlled within the range of ±0.05 millimeters. Therefore, in the third embodiment, chromatic aberration for different wavelengths could be significantly improved.

Figure 3C:
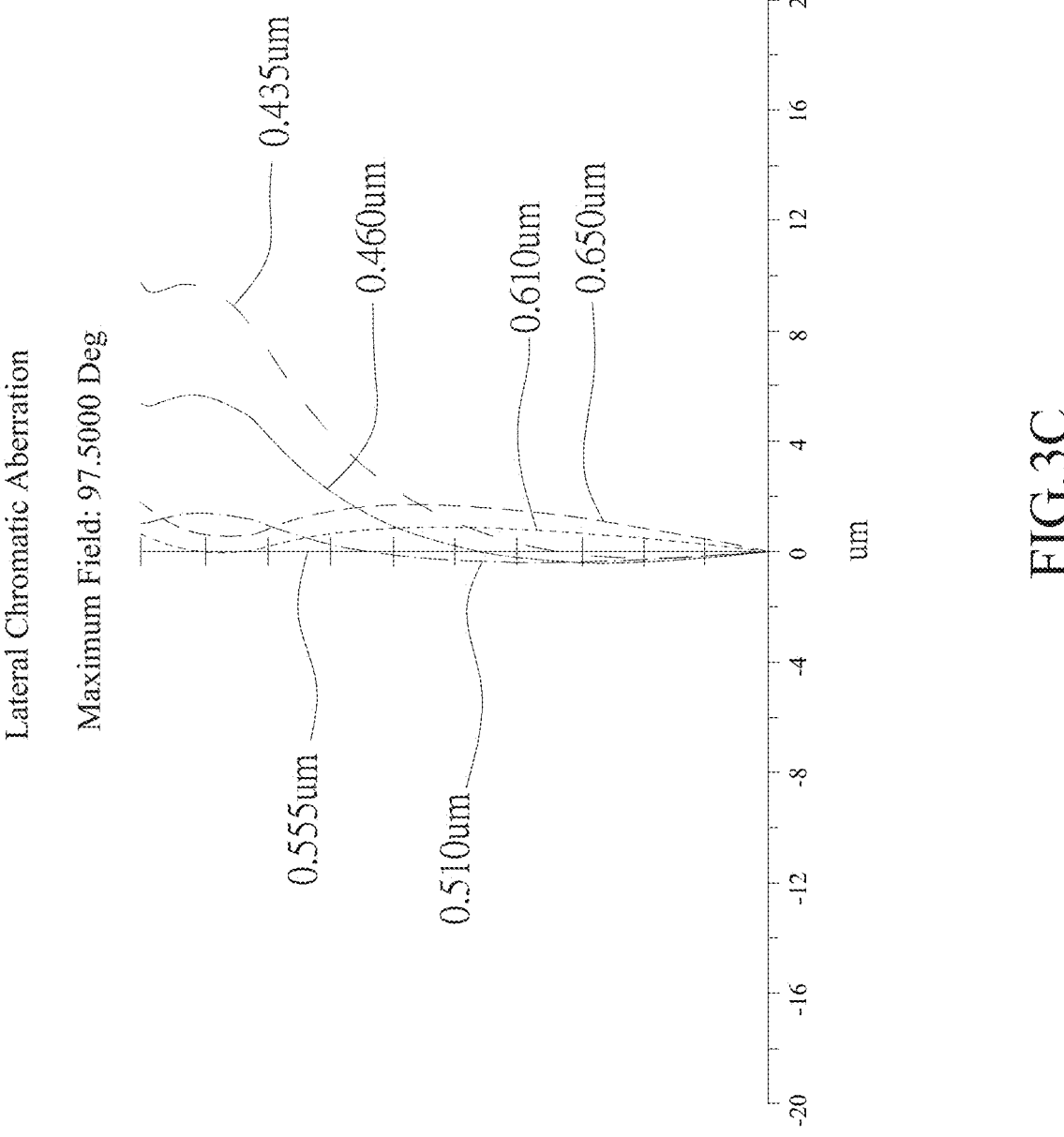
FIG. 3C is a diagram showing the lateral chromatic aberration of the optical imaging lens according to the third embodiment of the present invention.

The lateral chromatic aberration according to the third embodiment is illustrated in FIG. 3C. From FIG. 3C, it could be observed that at a maximum angle of view of 97.5000 degrees, and the lateral chromatic aberration values range from −2 micrometers to 9 micrometers, indicating that the optical imaging lens 300 is capable of effectively correcting lateral chromatic aberration, thereby achieving better image quality.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, comprising:
    a first lens assembly consisting of, in order from the object side to the image side along the optical axis, a first lens, a second lens, and a third lens, wherein the first lens has negative refractive power, an object-side surface of the first lens is a convex surface, and an image-side surface of the first lens is a concave surface; the second lens has negative refractive power, and an image-side surface of the second lens is a concave surface; the third lens has positive refractive power, and an image-side surface of the third lens is a convex surface;
    an aperture;
    a second lens assembly consisting of, in order from the object side to the image side along the optical axis, a fourth lens, a fifth lens, a sixth lens, and a seventh lens, wherein the fourth lens is a biconvex lens with positive refractive power; the fifth lens has positive refractive power, and an image-side surface of the fifth lens is a convex surface; the sixth lens is a biconcave lens with negative refractive power; the seventh lens is a biconvex lens with positive refractive power;
    wherein an air space is provided between any two adjacent lenses from the first lens to the seventh lens along the optical axis, and the optical imaging lens satisfies:

$0.2<F/fg2<0.5$, wherein F is a focal length of the optical imaging lens; fg2 is a focal length of the second lens assembly.

2. The optical imaging lens as claimed in claim 1, wherein an object-side surface of the second lens is a convex surface; an object-side surface of the third lens is a concave surface.

3. The optical imaging lens as claimed in claim 1, wherein the second lens is a biconcave lens, and an object-side surface of the second lens has at least one inflection point.

4. The optical imaging lens as claimed in claim 1, wherein the third lens is a biconvex lens, and an object-side surface of the third lens has at least one inflection point.

5. The optical imaging lens as claimed in claim 1, wherein an object-side surface of the fifth lens is a concave surface.

6. The optical imaging lens as claimed in claim 1, wherein the fifth lens is a biconvex lens.

7. The optical imaging lens as claimed in claim 1, wherein the optical imaging lens satisfies: $0.1<F/f3<0.3$, wherein f3 is a focal length of the third lens.

8. The optical imaging lens as claimed in claim 1, wherein the optical imaging lens satisfies: $0.2<F/f5<0.5$, wherein f5 is a focal length of the fifth lens.

9. The optical imaging lens as claimed in claim 1, wherein the optical imaging lens satisfies: $0.1<F/(f4+f5+f6+f7)<0.2$, wherein f4 is a focal length of the fourth lens; f5 is a focal length of the fifth lens; f6 is a focal length of the sixth lens; f7 is a focal length of the seventh lens.

10. The optical imaging lens as claimed in claim 1, wherein the optical imaging lens satisfies: $0<F/R1<0.15$, wherein R1 is a radius of curvature of the object-side surface of the first lens.

11. The optical imaging lens as claimed in claim 1, wherein the optical imaging lens satisfies: $0.35<F/R2<0.45$, wherein R2 is a radius of curvature of the image-side surface of the first lens.

12. The optical imaging lens as claimed in claim 1, wherein the optical imaging lens satisfies: $0.74<F/R4<0.82$, wherein R4 is a radius of curvature of the image-side surface of the second lens.

13. The optical imaging lens as claimed in claim 1, wherein the optical imaging lens satisfies: $−0.65<F/R11<−0.5$, wherein R11 is a radius of curvature of the image-side surface of the fifth lens.

14. The optical imaging lens as claimed in claim 1, wherein the optical imaging lens satisfies: $−0.4<fg1/(R1+R2+R3+R4+R5+R6+R8+R9+R10+R11+R12+R13+R14+R15)<0$; wherein fg1 is a focal length of the first lens assembly; R1 is a radius of curvature of the object-side surface of the first lens; R2 is a radius of curvature of the image-side surface of the first lens; R3 is a radius of curvature of an object-side surface of the second lens; R4 is a radius of curvature of the image-side surface of the second lens; R5 is a radius of curvature of an object-side surface of the third lens; R6 is a radius of curvature of the image-side surface of the third lens; R8 is a radius of curvature of an object-side surface of the fourth lens; R9 is a radius of curvature of an image-side surface of the fourth lens; R10 is a radius of curvature of an object-side surface of the fifth lens; R11 is a radius of curvature of the image-side surface of the fifth lens; R12 is a radius of curvature of an object-side surface of the sixth lens; R13 is a radius of curvature of an image-side surface of the sixth lens; R14 is a radius of curvature of an object-side surface of the seventh lens; R15 is a radius of curvature of an image-side surface of the seventh lens.

15. The optical imaging lens as claimed in claim 1, wherein the optical imaging lens satisfies: 0<fg2/(R1+R2+R3+R4+R5+R6+R8+R9+R10+R11+R12+R13+R14+R15)<0.3; wherein R1 is a radius of curvature of the object-side surface of the first lens; R2 is a radius of curvature of the image-side surface of the first lens; R3 is a radius of curvature of an object-side surface of the second lens; R4 is a radius of curvature of the image-side surface of the second lens; R5 is a radius of curvature of an object-side surface of the third lens; R6 is a radius of curvature of the image-side surface of the third lens; R8 is a radius of curvature of an object-side surface of the fourth lens; R9 is a radius of curvature of an image-side surface of the fourth lens; R10 is a radius of curvature of an object-side surface of the fifth lens; R11 is a radius of curvature of the image-side surface of the fifth lens; R12 is a radius of curvature of an object-side surface of the sixth lens; R13 is a radius of curvature of an image-side surface of the sixth lens; R14 is a radius of curvature of an object-side surface of the seventh lens; R15 is a radius of curvature of an image-side surface of the seventh lens.

16. The optical imaging lens as claimed in claim 1, wherein an object-side surface and the image-side surface of the second lens are aspheric surfaces.

17. The optical imaging lens as claimed in claim 1, wherein an object-side surface and the image-side surface of the third lens are aspheric surfaces.

18. The optical imaging lens as claimed in claim 1, wherein an object-side surface and the image-side surface of the fifth lens are aspheric surfaces.

19. The optical imaging lens as claimed in claim 1, wherein an object-side surface and an image-side surface of the sixth lens are aspheric surfaces.

20. The optical imaging lens as claimed in claim 1, wherein an object-side surface and an image-side surface of the seventh lens are aspheric surfaces.

* * * * *